US008826861B2

(12) United States Patent
Kuzniar et al.

(10) Patent No.: US 8,826,861 B2
(45) Date of Patent: Sep. 9, 2014

(54) ABSORBENT PAD FOR USE WITH ANIMAL CAGING SYSTEMS

(71) Applicant: Edstrom Industries, Inc., Waterford, WI (US)

(72) Inventors: Russell F. Kuzniar, Elkhorn, WI (US); Peter Steven Planton, Muskego, WI (US); Robert Dellemann, Mukwonago, WI (US); Kevin J. Anderson, Kansasville, WI (US)

(73) Assignee: Edstrom, Inc., Waterford, WI (US)

( * ) Notice: Subject to any disclaimer, the term of this patent is extended or adjusted under 35 U.S.C. 154(b) by 0 days.

(21) Appl. No.: 13/740,824

(22) Filed: Jan. 14, 2013

(65) Prior Publication Data

US 2014/0196666 A1   Jul. 17, 2014

(51) Int. Cl.
*A01K 1/015* (2006.01)

(52) U.S. Cl.
USPC .......................................... 119/479; 119/169

(58) Field of Classification Search
USPC .......... 119/479, 458, 471, 161, 163, 165, 169
See application file for complete search history.

(56) References Cited

U.S. PATENT DOCUMENTS

| 3,284,273 | A | * | 11/1966 | Prentice | 428/76 |
| 5,173,346 | A | * | 12/1992 | Middleton | 428/53 |
| 5,715,772 | A | * | 2/1998 | Kamrath et al. | 119/169 |
| 5,797,347 | A | * | 8/1998 | Ochi | 119/169 |
| 5,819,688 | A | * | 10/1998 | Walker | 119/169 |
| 5,865,144 | A |   | 2/1999 | Semenuk | |
| 5,996,535 | A |   | 12/1999 | Semenuk et al. | |
| 6,245,697 | B1 | * | 6/2001 | Conrad et al. | 442/370 |
| 6,363,890 | B1 | * | 4/2002 | Beck | 119/526 |
| 6,584,934 | B1 |   | 7/2003 | Willan | |
| 6,684,816 | B2 |   | 2/2004 | Lippincott | |
| 7,347,164 | B2 | * | 3/2008 | Axelrod et al. | 119/499 |
| 8,336,497 | B2 | * | 12/2012 | Van Zuilekom | 119/169 |
| 8,561,574 | B2 | * | 10/2013 | Tchekneva et al. | 119/479 |
| 2006/0144342 | A1 |   | 7/2006 | Iwaki et al. | |

OTHER PUBLICATIONS

Lenderking Caging Products ComfortCage Webpage (http://lenderking.com/CCM_cages/01CCM75.htm).
Fibercore NestPak Webpage (http://www.fibercorellc.com/nestpak.cfm).
Shepherd Specialty Products Poly Pads Webpage (http://www.ssponline.com/poly_pads.htm).
Harlan 6105 iso-Pads Enrichment Bedding Webpage (http://www.harlan.com/products_and_services/research_models_and_services/bedd..).
Harlan Custom-Cut Paper Cage Liners Webpage (http://www.harlan.com/products_and_services/research_models_and_services/bedd..).
Andersons Lab Bedding Recovery Pad Webpage (http://www.andersonslabbedding.com/irradiated/recovery-pad/).

(Continued)

*Primary Examiner* — Yvonne Abbott
(74) *Attorney, Agent, or Firm* — Boyle Fredrickson, S.C.

(57) ABSTRACT

A fluid absorbent assembly includes a fluid absorbent material located in an animal cage or in a liner inserted into the cage. The fluid absorbent material may comprise or be combined with a material that absorbs or neutralizes noxious vapors. A fluid permeable animal support structure may be located over the fluid absorbent material. The fluid absorbent material, which may be contained in a pad, may be contained in a housing that also forms the animal support structure. In the event of a drinking valve leak or other fluid leak within the cage, the fluid absorbent material expands and raises any animals located within the cage.

27 Claims, 9 Drawing Sheets

(56) References Cited

OTHER PUBLICATIONS

Shepherd Specialty Products Cage and Pan Liners Webpage (http://www.ssponline.com/cage_pan.htm).

Quality Cage EZ-Mat Cage Floor Mat Webpage (http://qualitycage.com/index.php? main_page=product_info&products_id=1792).

Absorbeez Water Absorbent Materials Webpage (http://www.absorbeez.com/index.php).

Water-Gel Crystals Webpage (http://watergelcrystals.com/).

* cited by examiner

ABSORBENT PAD FOR USE WITH ANIMAL CAGING SYSTEMS

BACKGROUND OF THE INVENTION

1. Field of the Invention

The invention relates generally to a fluid absorbent assembly, and more particularly, relates to a fluid absorbent assembly providing fluid absorption in an animal cage. The invention additionally relates to a method of using such an assembly.

2. Discussion of the Related Art

Modern laboratories and universities that perform research with test animals often require large animal populations. Such test animals typically include small mammals such as mice or rats, but may also include larger test animals. Isolating one or more test animals in a confined cage is often required to prevent comingling of the test population members and to control experimental variables. The cages often are installed in rack systems that include hundreds or even thousands of cages in order to conserve space, provide easy access to and visual inspection of the cages, and facilitate the supply of food, drinking water, and nesting material.

Within these rack systems, drinking water is supplied to the caged animals via animal-operated drinking valves. The drinking valve may, for example, include a stem that dispenses water when the stem is deflected by an animal. It may alternatively take the form of a simple sipper tube.

The valves may receive water from bottles or bags located within or adjacent to the cage or via manifolds that receive water from a central source of an integrated automated watering system. Manifolds typically are preferred in larger facilities because the monitoring and refilling of individual bottles or bags is time consuming.

However, the drinking valves within the individual cages are susceptible to forming leaks, as are other components within the integrated automated watering system. Additionally, infrequent human monitoring of the cages greatly limits the potential for early leak detection. As a result, even slow or low volume leaks have the potential for risking the well-being of the test animals over a long duration.

Prior cage systems have included ventilation and/or drainage holes located in the bottom the cages. However these systems risk flooding adjacent and lower cage via cascading water. Accordingly, with solid walled cages, any valve leak can risk the well-being of the animal or animals housed in the associated cage and potentially jeopardize the associated research.

Thus, despite prior attempts to mitigate the potential harmful effects of a valve leak in an animal cage, there remains need for improvement.

SUMMARY OF THE INVENTION

In accordance with a first aspect of the invention, a fluid absorbent assembly is provided having the capacity to absorb fluid, e.g., water, in an animal cage in response to a fluid leakage event within the animal cage while simultaneously elevating the test animal above the standing fluid level. The fluid absorbent assembly includes a fluid absorbent material insertable into the animal cage. The fluid absorbent material is capable of expanding in response to absorbing fluid.

The assembly may additionally include a relatively rigid animal support structure located above the fluid absorbent material. The animal support structure is capable of supporting the weight of at least one animal housed in the cage. The animal support structure is fluid-permeable as to allow fluids to pass therethrough to be absorbed by the fluid absorbent material. It may be either disposable or reusable.

The fluid absorbent material may be contained in a pad that is integrated with or separable from the animal support structure. The pad may be either disposable or reusable. The fluid absorbent material, whether it is free or contained in a pad, may be contained in a housing. The housing, if present, may also form the animal support structure or may be separated from it.

The animal support structure, if present, may comprise a relatively rigid platform that may be simply inserted into the cage above the fluid absorbent material or may be formed from an upper surface of a housing that contains the fluid absorbent material. That size of the platform may be substantially equal to that of the bottom surface of the animal cage. As such, the platform can act as a false floor capable of rising above the fluid that accumulates in the bottom of the cage in response to expansion of the absorbent pad during the leakage event.

If the fluid absorbent material is contained in a pad and the animal support structure comprises a platform, the platform may be formed either integrally with the pad or as a distinct structure that is integrated with or separable from the pad. For example, the platform may be part of a housing configured to receive the fluid absorbent pad. The housing may comprise either one or more housing elements and may be either disposable or reusable. In one embodiment, the housing is formed from a combination of the platform, forming a first housing element, and a floor frame located beneath the platform. The floor frame engages the bottom of the platform around the periphery of the housing and defines a receptacle between it and the platform in which the absorbent pad is placed. A central opening in the floor frame allows the absorbent pad to contact the bottom surface of the cage and to expand in the presence of fluid, squeezing through the central opening and lifting the housing. In this configuration, a dry absorbent pad contained within the housing may be easily and efficiently inserted into each animal cage in a rack system. Similarly, a fluid saturated and expanded absorbent pad may also be easily and efficiently removed from an animal cage.

In another example, that fluid absorbent material, either in a loose form or as contained within pad, may be contained in a housing having first and second housing elements that each is serviceable as an animal support structure, thus permitting the housing to be placed in the cage with either surface facing up. The first and second housing elements may be symmetrical in size and shape.

In accordance with yet another aspect of the invention, an animal bedding material may be contained in a frangible pouch over cover located over the upper surface of the platform.

In yet another example, the fluid absorbent material can be used without an animal support structure, and may, if desired, be either positioned beneath a layer of bedding material, be mixed with bedding material, or even double as bedding material.

In accordance with yet another aspect of the invention, the fluid absorbent assembly may be adapted to cooperate with a cage liner to further improve the efficiency and quality with which the cages are changed, i.e., cleaned. The cage liner has a bottom and walls substantially equal in size and shape to the interior of the animal cage, and is configured to be inserted into the interior of the cage. The fluid absorbent material, housing and/or animal bedding material may be configured to be placed within the cage liner. Over a period of days, or in the event of a fluid leak, the contents of the cage liner may become soiled and/or flooded and require changing. At such a time, the entire cage liner, including its contents, may be removed from the cage and replaced by a new and dry cage liner and fluid absorbent assembly. The cage liner may either be disposable or reusable.

In accordance with still another aspect of the invention, the fluid absorbent material may include one or more additives. For example, the fluid absorbent material or a material impregnated into, mixed with, or otherwise combined with it may be capable of absorbing or neutralizing noxious vapors.

The fluid absorbent material may also include visual indicia that changes color in the presence of fluid, thus providing an optically detectable indicator of material expansion. Expansion of the fluid absorbent material also may be monitored, for example, by electrical sensors or thermally.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention is illustrated in the accompanying drawings in which like reference numerals represent like parts throughout, and in which.

DETAILED DESCRIPTION OF THE PREFERRED EMBODIMENT

A wide variety of fluid absorbent assemblies could be constructed in accordance with the invention as defined by the claims. Hence, while several exemplary embodiments of the invention will now be described, it should be understood that the invention is in no way limited to any of those embodiments.

1. Fluid Absorbent Pad, Housing and Cage Liner Embodiment

Figure 1:
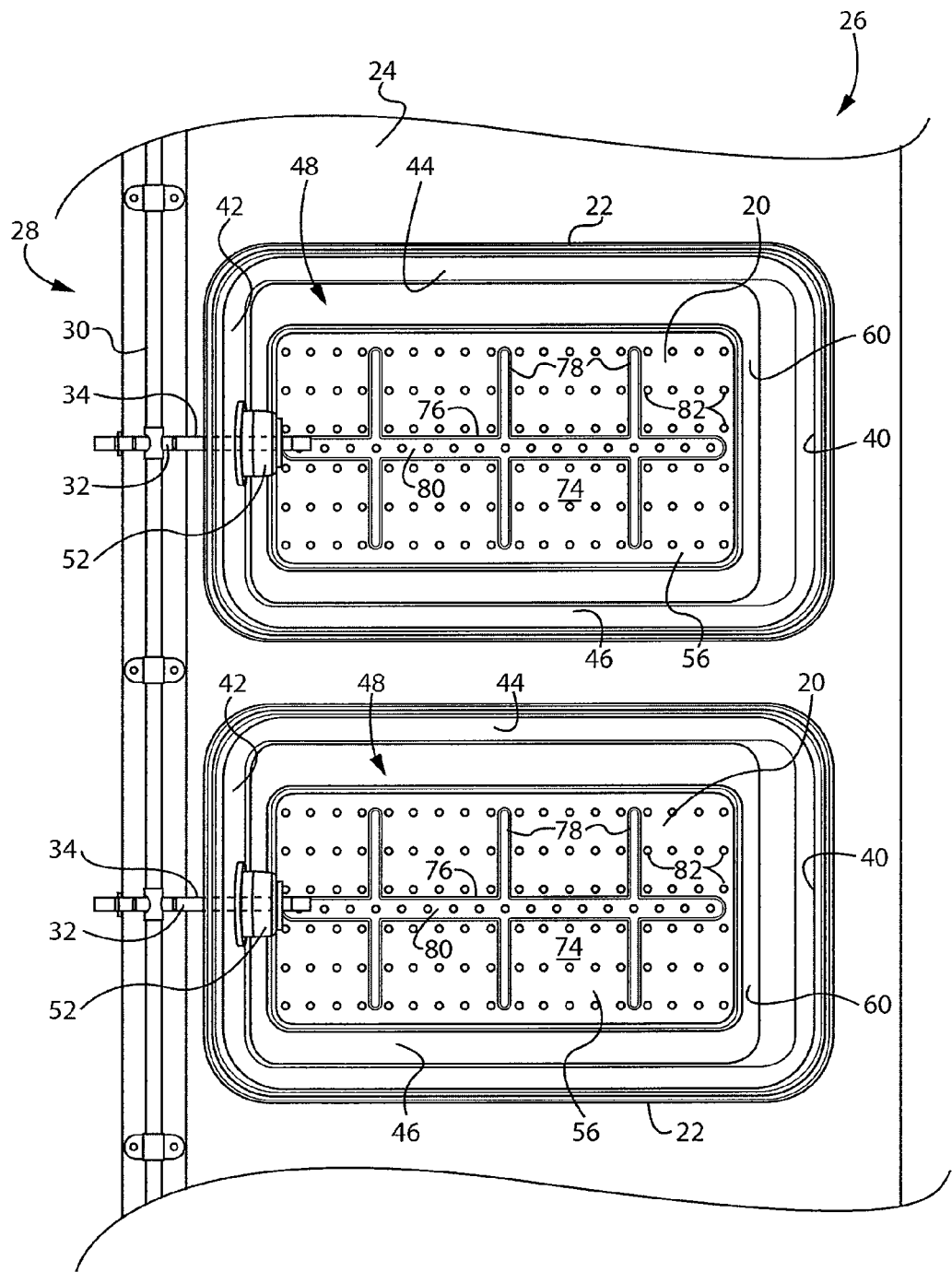
FIG. 1 is a top plan view of a portion of a rack system having multiple cages, each cage incorporating a fluid absorbent pad assembly in accordance with an embodiment of the invention.

FIGS. 1-6 illustrate a fluid absorbent assembly in accordance with one embodiment of the invention and generally taking the form of a fluid absorbent pad assembly 20 including a fluid absorbent pad 54 and a platform 56. Referring initially to FIG. 1, the fluid absorbent pad assemblies 20 are placed in cages 22 mounted in rows 24 of a cage and rack system 26. Each cage 22 within the cage and rack system 26 is supplied with drinking water by way of a water supply system 28. The water supply system 28 may include a common manifold 30 supplying water to all cages 22 on the rack system 26. Alternatively, the water supply system 28 could include bottles or bags located on, in, or adjacent to the individual cages 22. In the illustrated embodiment in which the water supply system 28 includes a manifold 30, an individual drinking valve 32 extends from the manifold 30 into each cage 22. Each drinking valve 32 of this embodiment includes a generally cylindrical valve housing 34 and a stem 36 that extends beyond a front end of the valve housing 34 or that is located within a flared or partially cut-away end of the housing 34 so as to be accessible by an animal housed in the cage 22. When an animal moves or pivots the stem 36 relative to the housing 34, a seal is broken within the drinking valve 32, and a volume of drinking water is released to the animal. However, when the drinking valve 32 malfunctions, it is possible for a leak to form in the water supply system 28 and risk flooding the animal cage 22.

It should be stressed at this point that fluid absorbent assemblies disclosed herein are also usable with other types of drinking valves and other water sources. For example, they are usable with simple sipper tubes coupled to bags or bottles. For the sake of simplicity, any device that can deliver water to an animal on demand is considered a "drinking valve."

Still referring now to FIGS. 1-6, and particularly to FIG. 1, each cage 22 has a floor 38, a front wall 40, a rear wall 42, two opposing side walls 44, 46, and a lid (not shown). The front 40, rear 42 and side walls 44, 46 are oriented generally perpendicular to the floor 38 of the cage 22 and together define an interior 48 of the cage 22 configured to receive one or more animals therein. The rear wall 42 of the cage 22 includes an opening 50 for passing the drinking valve 32 therethrough and into the interior 48 of the cage 22. A grommet 52 is mounted over the opening 50 for receiving the drinking valve 32. It should be stressed that cages 22 may vary dramatically from the illustrated configuration depending, for example, on the species of animals intended to be housed therein and the nature of the facility in which the cage 22 is located. For example, the lid could take the form of a filter bonnet (not shown) having an internal filter for preventing the transfer of air from one cage to another.

Figure 2:
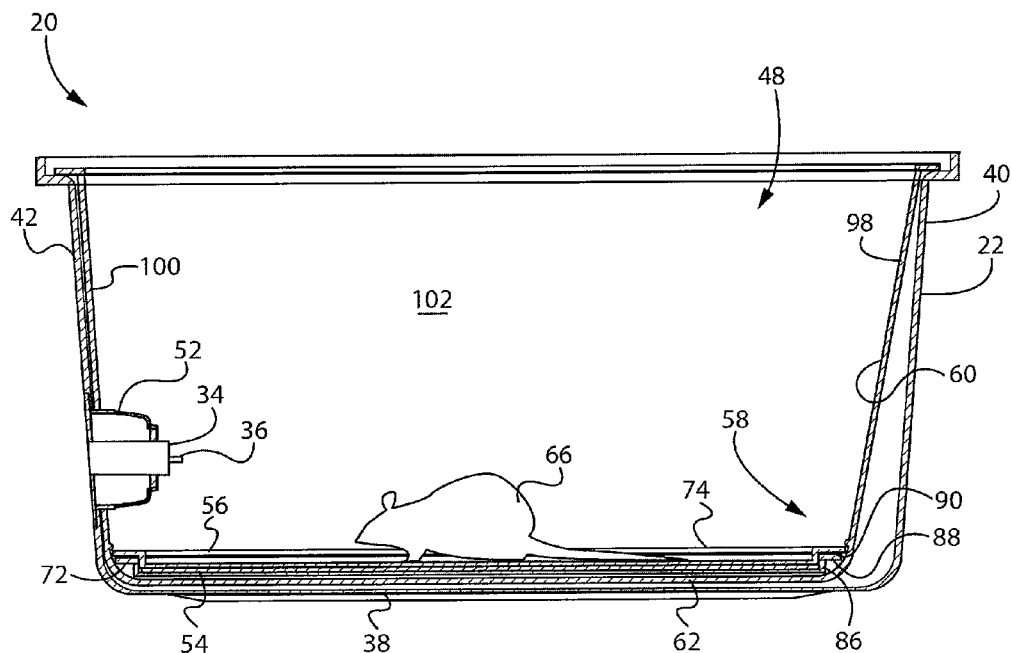
FIG. 2 is a sectional side elevation view of a cage incorporating a fluid absorbent assembly of FIG. 1, showing the cage without a drinking valve leak.

Still referring now to FIGS. 1-6, and now particularly to FIG. 2, one of the fluid absorbent pad assemblies 20 is illustrated within the interior 48 of the associated cage 22. The fluid absorbent pad assembly 20 includes at least a lower fluid absorbent pad 54 and an upper water permeable animal support structure. It is conceivable that the animal support structure could be formed from the pad 54 itself if the pad is sufficiently resistant to being torn or bitten into by an animal. In the illustrated embodiment, the animal support structure comprises a platform 56. The platform 56 could be formed integrally with the pad 54 or could be formed as a separate element affixed to or simply stacked upon the pad 54. In this embodiment, the platform 56 forms an element of a two-element a housing 58 configured for placement in a cage liner 60. The fluid absorbent pad 54 is configured to be received on the bottom of the floor 62 of the cage liner 60, within the housing 58. It is conceivable, however, that the pad 54 could be supported on a ledge or false floor located above the bottom surface of the cage liner 60. The illustrated pad 54 is sized and shaped to fit into standard 64 in$^2$ (412.8 cm$^2$) cage. When it is dry and thus non-expanded, the pad 54 has a height of approximately 0.6 centimeters, a width of approximately 13.5 cm, and a length of approximately 23.6 cm. Of course, pads of other sizes and shapes would be employed with other cage designs.

The fluid absorbent pad 54, or at least its interior, is substantially formed of a fluid absorbent material that expands upon absorbing fluid water or other fluids such so as to lift the platform 56. The pad 54 may be either reusable or disposable. The absorbent material may include one or more non-toxic and autoclavable materials capable of absorbing water and possibly other fluids such as urine. Suitable materials include, but are not limited to, cellulose fiber, starch, air-laid paper, and super-absorbent polymers including, polyacrylate, and sodium polyacrylate. The fluid absorbent material may be dispersed throughout the fluid absorbent pad 54.

In addition to containing a fluid absorbent material, the fluid absorbent pad 54 may also contain a noxious vapor absorbent and/or neutralizing material. "Noxious vapors" in this regard means any airborne material that produces odors or exhibits other characteristics that are deleterious to animals housed in the cage or personnel or animals in the vicinity of the cage. Such materials include, but are not limited to ammonia, nuisance odors, volatile organic compounds, and pheromones. Such vapors are considered to be absorbed or neutralized when either the vapors themselves or a source of them are absorbed or neutralized. Suitable noxious vapor absorbent materials may include, but are not limited to, volcanic ash and carbon. By absorbing or neutralizing noxious vapors, it is possible to prolong the duration between cage changes.

Furthermore, the fluid absorbent pad may also include a transformative visual indicia 68 (FIG. 4), such as a color changing indicia, that transforms in the presence of water or otherwise provides a visual indication that the pad 54 is wet. The transformative visual indicia 68 is located on an outer surface of the fluid absorbent pad 54, and preferably on a surface that may be readily seen by either a technician or a camera or other visual monitor such as a laser or an infrared sensor. Expansion and/or the presence of water in the cage may also be detected by other sensors such as a humidity sensor or a proximity indicator. If used in conjunction with a camera or other visual monitor or other sensor, the change in the visual appearance of the transformative visual indicia 68 or other signal may trigger an alarm identifying the existence and location of a drinking valve leak. Other sensors, such as conductive, capacitive, or thermal sensors, also could be used.

Still referring to FIG. 2, the housing 58 of this embodiment includes the platform 56 as the first housing element, and also has a second housing element 72. The platform 56 is formed from a material that cannot be bitten into by animals, such as a relatively hard plastic. The platform 56 also should be sufficiently rigid so as to capable of supporting at least one animal 66 thereon and to remain dimensionally stable when it lifted by the expansion of the underlying fluid absorbent pad 54. As illustrated in FIG. 1, the platform 56, as configured or use with "standard" cage dimensions as discussed above, has a width of 14.9 cm and a length of 24.9 cm, which is substantially equal to the upper surface of the cage liner floor 62. However, in an alternative embodiment that does not include a cage liner 60, the platform may be sized to substantially equal the cage floor 38, including a width of 15.2 cm and a length of 26.7 cm. Of course, platforms of other sizes and shapes would be employed with other cage and/or cage liner designs.

The upper surface 74 of the platform 56 is substantially planner, so as to provide a flat support surface for at least one animal 66. In order to be resistant to flexing or twisting during expansion of the fluid absorbent pad 54, the upper surface 74 may also include one or more longitudinal troughs or ridges 76 and/or one or more lateral troughs or ridges 78 that are slightly recessed into the upper surface 74 of the platform 56. In addition to providing rigidity, such troughs 76, 78 may further provide a channel 80 in which leaking fluid may flow along the upper surface 74 of the platform 56 prior to engaging the fluid absorbent pad 54, as to be directed towards the center of the animal cage 22 and away from the periphery, which may otherwise result in asymmetrical expansion of the fluid absorbent pad 54. To facilitate fluid transfer from the upper surface 74 of the platform 56 to fluid absorbent pad 54, a plurality of apertures 82 extends throughout the first housing element 70. In order to prevent the paws of the animals 66 from becoming unintentionally caught within the apertures 82 while also maintaining sufficient fluid flow there through, the diameter of the apertures 82 is preferably typically between 0.76 mm and 3.2 mm and more preferably between 1.5 mm and 3.2 mm.

Still referring to FIGS. 1-6, the second housing element 72 is illustrated as a floor frame located below the platform 56 serving as the first housing element 70. As with the first housing element 70, the floor frame 72 is a relatively rigid and durable element formed and/or injection molded, for example, from a rigid plastic. The floor frame 72 has a width of approximately 14.9 cm, and a length of approximately 24.9 cm, which are substantially equal to the dimensions of upper surface of the cage liner floor 62. However, in an alternative embodiment that does not include a cage liner 60, the floor frame 72 may be sized to substantially equal the size the cage floor 38, including a width of approximately 15.2 cm, and a length of approximately 26.7 cm. The floor frame 72 also could be sized and/or otherwise configured to be supported on a ledge, a false floor, or another structure above the bottom of the cage or cage liner.

Figure 3:
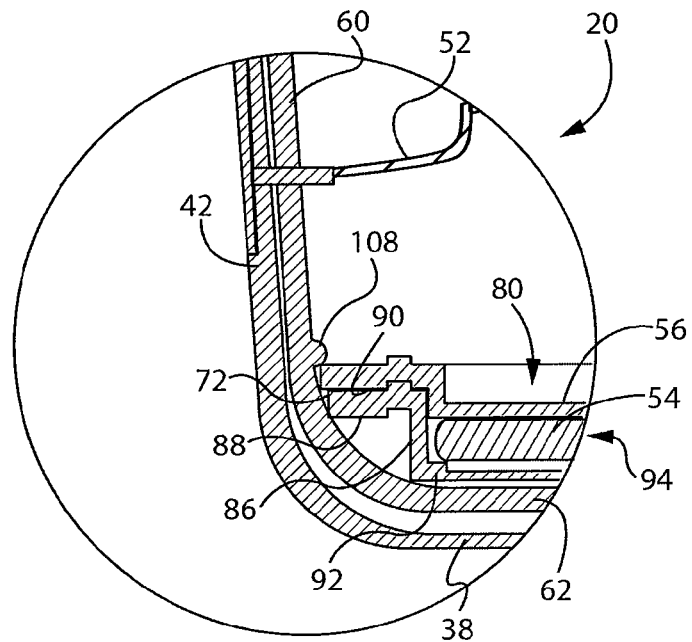
FIG. 3 is a detail sectional view of a corner of the cage incorporating an absorbent assembly of FIGS. 1 and 2, showing the cage without a drinking valve leak.
Figure 5:
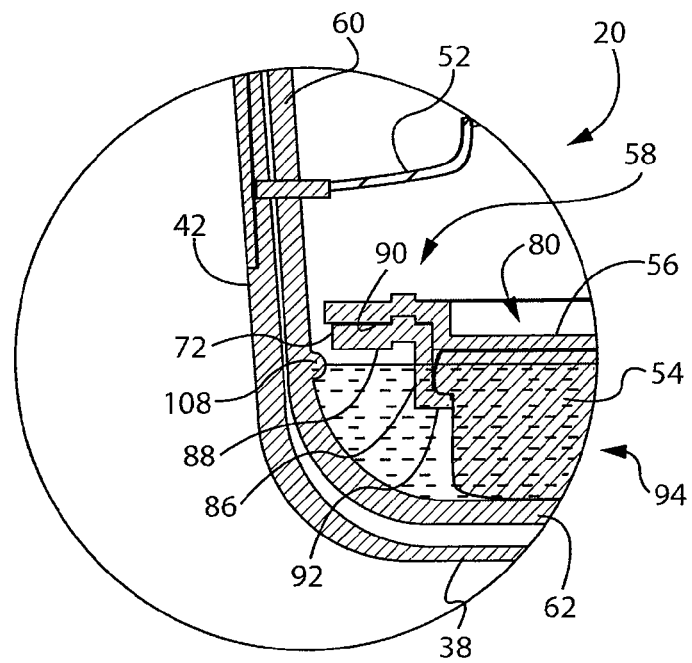
FIG. 5 is a detail sectional view of a corner of the cage incorporating the absorbent assembly of FIGS. 1-4, showing the cage with a drinking valve leak.
Figure 6:
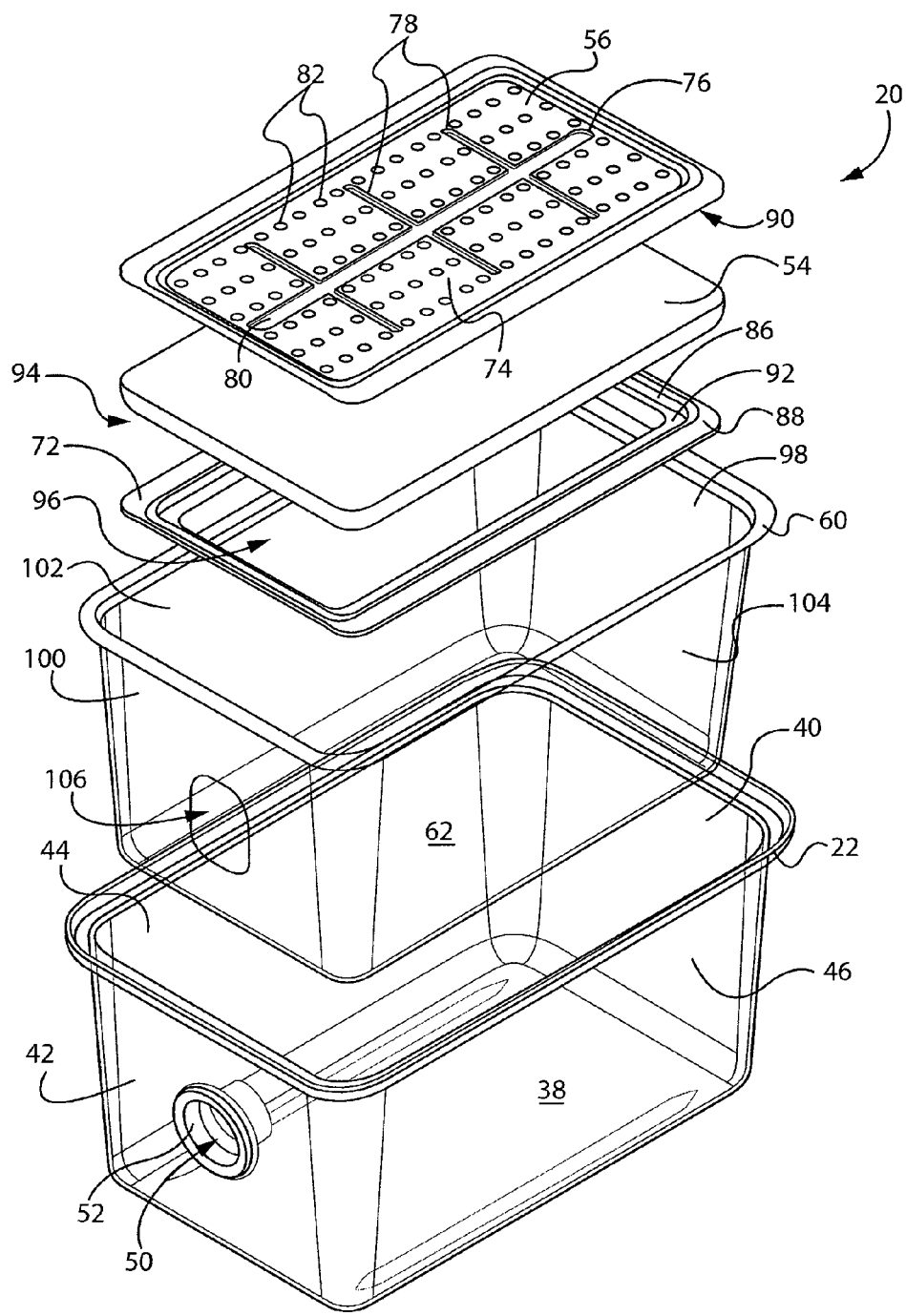
FIG. 6 is an exploded perspective view of a cage incorporating the fluid absorbent assembly of FIGS. 1-5.

Referring especially to FIGS. 3 and 5, the floor frame 72 includes a vertical peripheral wall 86 and a first flange 88. The first flange 88, configured to mate with a lower surface 90 of the platform 56, and extends outwardly from an upper end of the peripheral wall 86. The mating of the two housing elements 56, 72 may include a snap fit closure as best seen in FIGS. 3 and 5. A second flange 92 extends inwardly from a lower end of the peripheral wall 86 to define receptacle 94 between the two housing elements 56, 72 that is configured to receive the fluid absorbent pad 54 therein. The peripheral wall 86 of the floor frame 72 engages the outer edges of the fluid absorbent pad 54, and retains the fluid absorbent pad 54 in the receptacle 94 when the fluid absorbent pad 54 is both dry and wet. In this configuration, as shown in FIG. 2, the opening 96 that is defined by the bordering second flange 92 allows the fluid absorbent pad 54 to directly engage at least a portion of the upper surface of cage liner floor 62 (or the cage floor 38 when the cage liner 60 is absent) while remaining within the receptacle 94. As discussed in more detail below, upon expanding, the absorbent pad 54 squeezes through the opening 96 to lift the housing 58 away from the bottom of the cage 22 or the liner 60, this keeping the upper surface 74 of the platform 56 above the water level in the cage 22.

Referring again to FIGS. 1-6, the optional cage liner 60 has, in addition to the floor 62, a front wall 98, a rear wall 100, and two opposing side walls 102, 104, all formed integrally with one another from a single piece of a molded plastic. The floor 62 and walls 98, 100, 102, 104 of the cage liner 60 are substantially equal in size and shape to the inner surfaces of the floor 38 and four walls 40, 42, 44, 46 of the cage 22, so as to allow the cage liner 60 to be inserted into the animal cage 22. The rear wall 100 of the cage liner 60 includes an opening 106 for receiving the grommet 52 and drinking valve 32. If used with a cage and bottle the liner may not have the opening for the valve.

The cage liner 60 preferably incorporates one or more mechanisms to releaseably retain the absorbent pad assembly 20 in place when cage 22 is dry but to permit the platform 56 to be lifted relative to the cage liner 60 upon absorbent pad 54 expansion. Referring to FIGS. 3 and 5, suitable mechanisms include tabs or lugs 108 protruding inwardly from the inner surfaces of the front and rear cage liner walls 98, 100. Tabs (not shown) may also be proved on one or both side walls of the liner instead or in addition to the front and rear liner walls 98, 100. Two or more tabs 108 may be provided on each of the front and rear walls 98, 100 of the cage liner 60. These tabs 108 are configured to engage the front and rear edges of the platform 56 in a snap-fit manner when the absorbent pad assembly 20 is inserted into the cage liner 60. These tabs 108 prevent the at least one animal 66 from raising the housing 58 and accessing the fluid absorbent pad 54 located underneath the platform 56. These tabs 108 are also configured to disengage from housing 58 upon expansion of the fluid absorbent pad 54, thereby allowing the housing 58 to rise in response to a fluid leak as best seen in FIG. 5.

Figure 4:
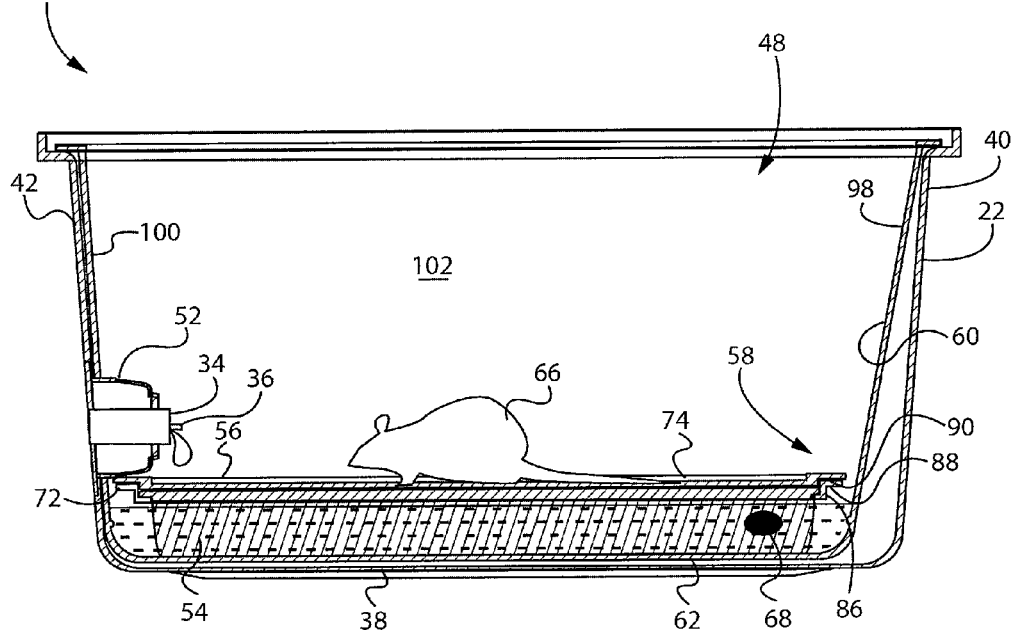
FIG. 4 is a sectional side elevation view of a cage incorporating a fluid absorbent assembly of FIG. 1, showing the cage with a drinking valve leak.

Referring now to FIGS. 4 and 5, the fluid absorbent pad assembly 20 described above is illustrated in a fluid leak environment, with water entering the animal cage 22 by way of the leaking drinking valve 32. As illustrated, the fluid absorbent pad 54 has expanded by absorbing water. Absorption of water into the fluid absorbent pad 54 causes the expanding fluid absorbent pad 54 to squeeze through the opening 96 in the floor frame 72, simultaneously exerting a force against both the upper surface of the cage liner floor 62 and the housing 58. Resultantly, the force exerted by the expansion of the fluid absorbent pad 54 on the housing 58 is sufficient to disengage the housing 58 from the cage liner tabs 108 and to lift the upper surface 74 of platform 56 above the water level.

At the point of saturation, the fluid absorbent pad 54 is configured to retain preferably between 1 ml and 2,000 ml of water and more preferably at least 10 ml of water. The fluid absorbent pad 54 of this embodiment preferably will provide preferably approximately more that 6 hour of fluid absorption during an average drinking valve 32 leak prior to reaching the saturation point, and more preferably approximately more that 8 hour of fluid absorption during an average drinking valve 32 leak prior to reaching the saturation point. However, some catastrophic water leaks may occur at a rate as high as 10 ml per minute. In the case of such a catastrophic water leak, the fluid absorbent pad 54 of the present invention will provide preferably approximately more that 1 hour of fluid absorption prior to reaching the saturation point, and more preferably at least about 3 hours of fluid absorption prior to reaching the saturation point.

When the fluid absorbent pad 54 is fully saturated with water, its height will more than one and a half times the height of a dry fluid absorbent pad, preferably at least approximately four times the height of a dry fluid absorbent pad, and more preferably at least approximately six times the height of a dry fluid absorbent pad. That is to say, when the fluid absorbent pad 54 is fully saturated with 1,800 ml of water, its height will preferably be at least 20 mm, and more preferably 32 mm. In one embodiment, the fluid absorbent pad 54 may expand to a fully saturated height of 38 mm, such that platform 56 is raised at least to a height of the bottom of the grommet 52. In this embodiment any additional water that leaks into the animal cage 22 will flow out of the opening 50 in the rear wall 42 of the cage 22, without potentially harming the well-being of the at least one animal 66

2. Fluid Absorbent Pad, Housing, Bedding Material, and Cage Liner Embodiment

Figure 7:
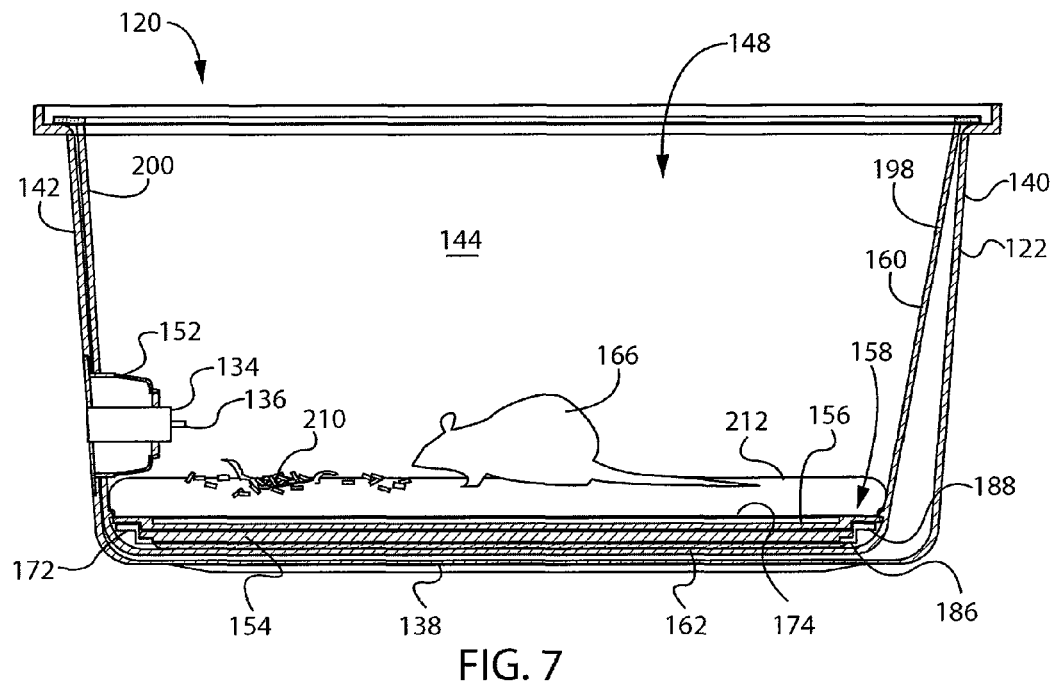
FIG. 7 is a sectional side elevation view of a cage incorporating a fluid absorbent assembly constructed in accordance with an alternative preferred embodiment of the invention, showing the cage without a drinking valve leak.
Figure 8:
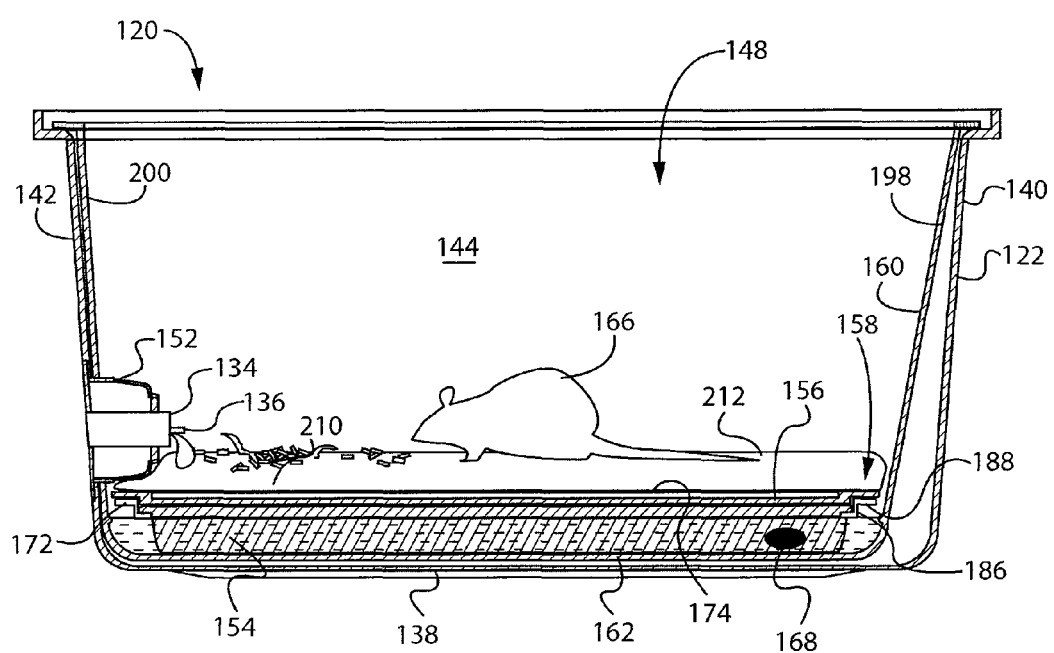
FIG. 8 is a sectional side elevation view of the cage incorporating a fluid absorbent assembly of FIG. 7, showing the cage with a drinking valve leak.

Turning now of FIGS. 7 and 8, an alternative embodiment of the fluid absorbent pad assembly 120 is illustrated that differs from the fluid absorbent pad assembly 20 of the first embodiment only in that it additionally includes an animal bedding material. The remaining portions of the fluid absorbent pad assembly 120, including the fluid absorbent pad 154, housing 158, and cage liner 160, are consistent with their prior description. Elements of the embodiment of FIGS. 7 and 8 corresponding to elements of the embodiment of FIGS. 1-6 are designated by the same reference numeral, incremented by 100. Descriptions of many of those elements are abbreviated or even eliminated for the sake of brevity. Suffice it to say that the fluid absorbent pad assembly 120 includes a fluid absorbent pad 154 retained in a housing 158 snap fit into the bottom of the cage liner 160. The housing 158 includes 1) a first or upper housing element formed from a fluid permeable platform 156 and 2) a second or lower housing element or floor frame 172 having a receptacle 194 for holding the fluid absorbent pad 154 and having a central opening 196.

As illustrated in FIGS. 7 and 8, the animal bedding material 210 is located within the cage liner 160, above the upper surface 174 of the platform 156. The animal bedding material 210 is provided to allow the at least one animal 166 within the animal cage 122 the activity of unfurling and manipulating the bedding material 210, as well as providing material with which to form a nest. The bedding material 210 may include, for example, one or more of the following non-toxic and autoclavable materials: paper, cellulose, wood chips, and cotton fiber.

As illustrated in FIGS. 7 and 8, the bedding material 210 may also be contained within a frangible cover 212 that prevents the bedding material 210 from spilling during handling and transport. The cover 212 also allows the bedding material 210 contained therein to remain evenly distributed over the upper surface 174 of the platform 156, and reduce the potential of the bedding material 210 clumping beneath the drinking valve 132 where it may prevent water from reaching the fluid absorbent pad 154 during a leak. Alternatively, the bedding material 210 may be removed or decreased in the area located below the drinking valve 132 to promote fluid permeability. The frangible cover 212 may be perforated to decrease the cover's surface tension, improve fluid permeability, and promote animal engagement. In one embodiment, the frangible cover 212 and bedding material 210 contained therein may be affixed to the upper surface 174 of the platform 156. Alternatively, the frangible cover 212 and bedding material 210 may be structurally independent of the housing 158. Hence, the cover 212 will form a self-contained pouch (not shown).

Referring now to FIG. 7, the fluid absorbent pad assembly 120, including the animal bedding material 210, is illustrated in detail in a dry orientation. As illustrated, the animal bedding material 210 is located above the housing 158, with the housing 158 secured to the cage liner 160 via the protruding tabs 208. Given the supple nature of the frangible cover 212 and animal bedding material 210, the frangible cover 212 has deformed around the protruding tab 208 on the liner 160. As such, the animal bedding material 210 does not inhibit the housing's ability to disengage from the protruding tabs 208 during expansion of the fluid absorbent pad 154.

Turning now to FIG. 8, the fluid absorbent pad assembly 120 described above is illustrated in a fluid leak environment, with water entering the animal cage 122 by way of the leaking drinking valve 132. The water has passed through the animal bedding material 210 and the platform 156, and has been absorbed by the fluid absorbent pad 154. The force exerted by the expansion of the fluid absorbent pad 154 on the housing 158 is sufficient to disengage the housing 158 from the cage liner tabs 208 without hindrance from the animal bedding material 210 and to elevate at least the upper surface 174 of the platform 156 above the water level.

3. Fluid Absorbent Pad and Housing Embodiment

Figure 9:
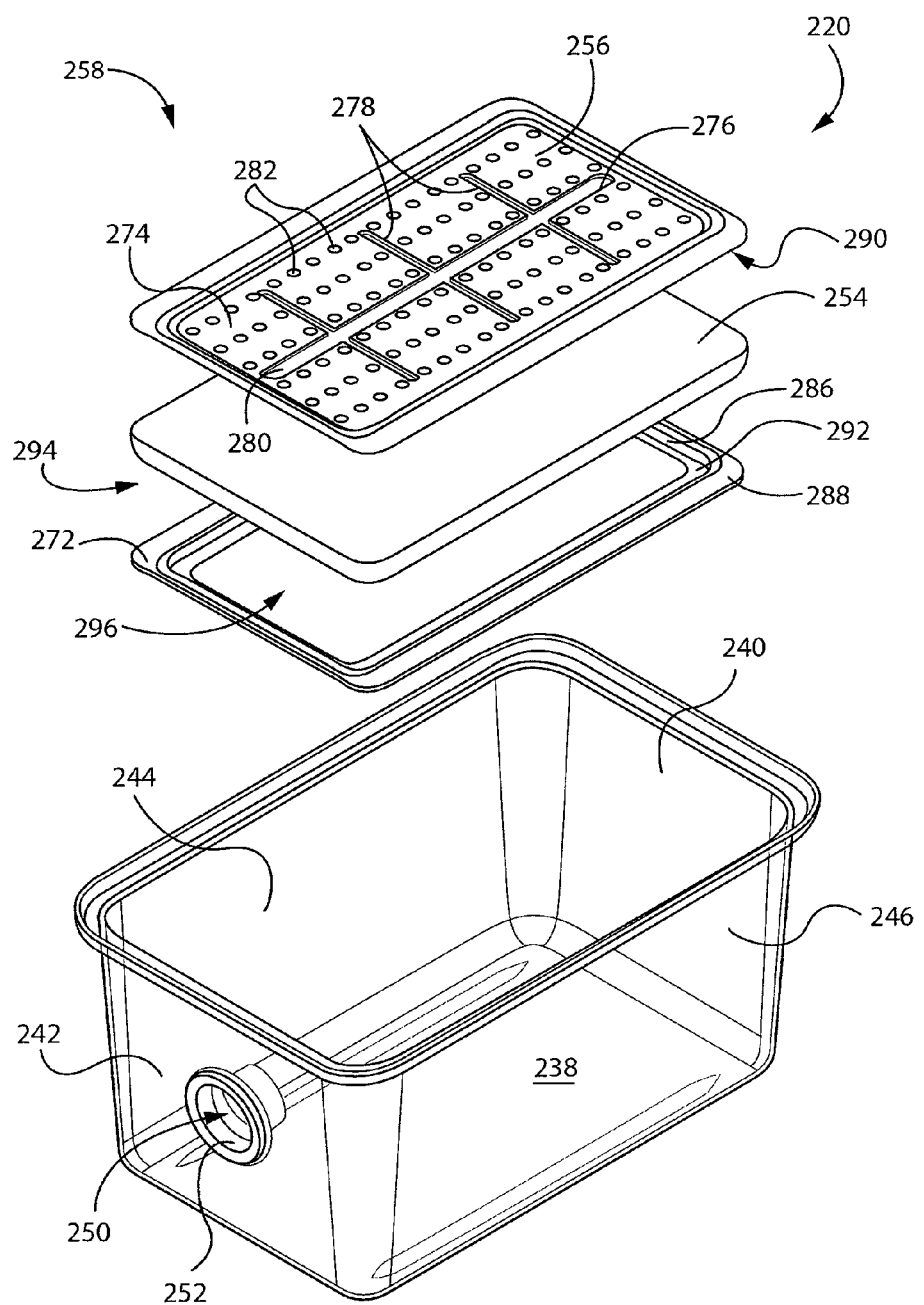
FIG. 9 is an exploded perspective view of a cage incorporating a fluid absorbent assembly constructed in accordance with a third embodiment of the invention.

Referring now to FIG. 9 an alternative embodiment of the fluid absorbent pad assembly 220 is illustrated in which the fluid absorbent pad assembly 220 is mounted directly in the cage 222 rather than in a cage liner. Again, elements of the embodiment of FIG. 9 that correspond to elements of the embodiment of FIGS. 1-6 are designated by the same reference numeral, incremented by 200. Descriptions of many of those elements are abbreviated or even eliminated for the sake of brevity.

The fluid absorbent pad assembly 220 of this embodiment is configured to be received on the upper surface of the cage floor 238 of the above-described "standard" cage or on a surface above that floor, as opposed to the upper surface of the cage liner floor. Therefore, in this embodiment both the first and second housing elements 270, 272 have a width of approximately 15.2 cm, and an increased length of approximately 26.7 cm, which is substantially equal to the width and length of the cage floor 238. The increase in length of the housing 258 corresponds to the absence of a tapered wall that was present in the cage liner. Similarly, the fluid absorbent pad 254 has a width of approximately 13.5 cm and an increased length of approximately 23.6 cm to accommodate the larger receptacle 294 within the housing 258.

While not shown in FIG. 9, in an alternative embodiment, an animal bedding material contained within a frangible cover, as previously described, may also be included in the fluid absorbent pad assembly 220 lacking a cage liner.

Figure 10:
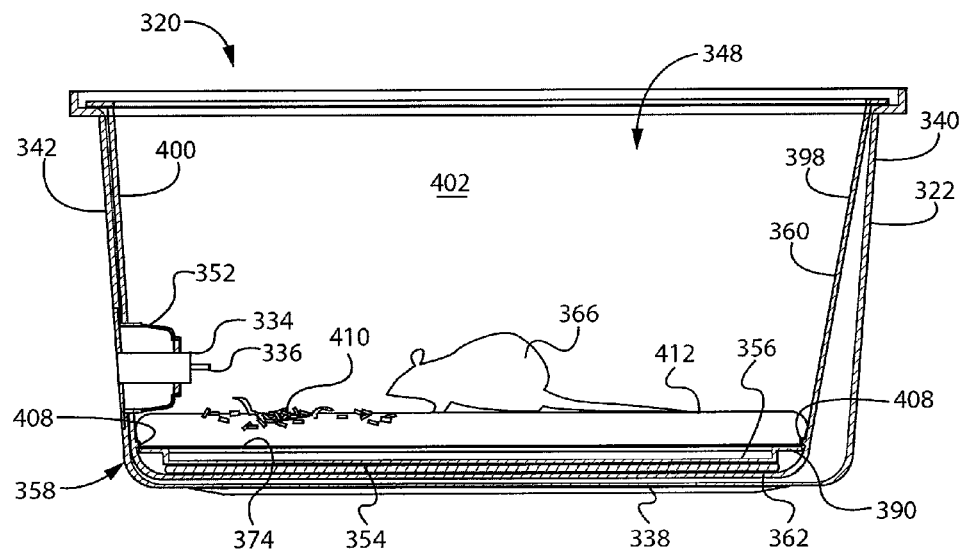
FIG. 10 is a partially cut away side elevation view of a cage incorporating a fluid absorbent assembly constructed in accordance with another alternative preferred embodiment of the invention, without a drinking valve leak.

4. Fluid Absorbent Pad, Fluid Permeable Upper Surface, Animal Bedding Material and Cage Liner Embodiment Referring now to FIGS. 10 and 11, still another alternative embodiment of the fluid absorbent pad assembly 320 is illustrated in which the fluid absorbent pad assembly 320 includes a fluid absorbent pad 354, a fluid permeable upper platform 356, and animal bedding material 410, all configured for placement in a cage liner 360. Again, elements of the embodiment of FIGS. 10 and 11 that correspond to elements of the embodiment of FIGS. 1-6 are designated by the same reference numeral, now incremented by 300. This alternative embodiment differs from that illustrated in FIGS. 7 and 8 in that it the housing 358 includes only the upper portion or the fluid permeable platform 356 located above the upper surface of the fluid absorbent pad 354.

Figure 11:
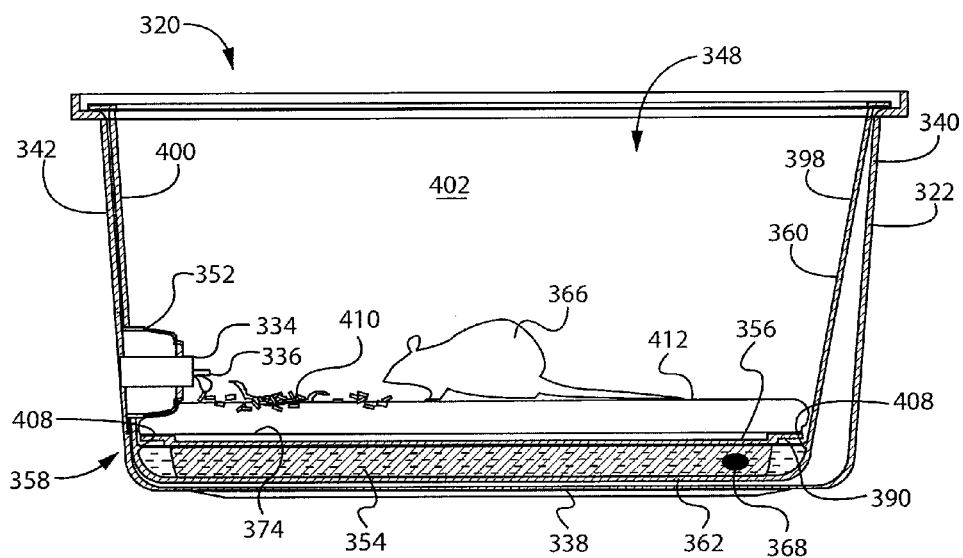
FIG. 11 is a partially cut away side elevation view of the cage incorporating a fluid absorbent assembly of FIG. 10 with a drinking valve leak.

The platform 356 of this embodiment has a width of approximately 14.9 cm, and a length of approximately 24.9 cm, which is substantially equal in size and shape to the upper surface of the cage liner floor 362. However, in an alternative embodiment that does not include a cage liner 360, the platform 356 may be sized to substantially equal the cage floor 338, including a width of approximately 15.2 cm, and a length of approximately 26.7 cm. The platform 356 snap-fits into the cage liner 360 by engaging inwardly protruding tabs 408, just as in the previous embodiments. As illustrated in FIG. 11, the platform 356 is independent of the fluid absorbent pad 354, and the two components are stacked into the cage liner 360 sequentially in use. However, it is considered well within the scope of the invention that the platform 356 could be a portion of or otherwise affixed to the fluid absorbent pad 354.

The upper surface of the platform 356 is substantially planar, as to provide a flat surface 374 on which to support the at least one animal 366 thereon. In order to reduce flexing or twisting of the platform 356 during expansion of the fluid absorbent pad, the platform 356 may also include one or more troughs or ridges (not shown) disposed within its upper surface 374. In addition to providing rigidity, such troughs may further provide a channel 380 in which leaking fluid may flow along the upper surface 374 of the first housing element, prior to engaging the fluid absorbent pad 354, as to be directed towards the center of the animal cage 322 and away from the periphery, which may otherwise result in asymmetrical expansion of the fluid absorbent pad 354.

To facilitate fluid transfer through the platform 356 to fluid absorbent pad 354, a plurality of apertures (not shown) are disposed extending throughout the platform 356. In order to prevent the paws of the one or more test animal 366 from becoming unintentionally caught within the apertures while maintaining sufficient fluid flow there through, the diameter of the apertures is preferably typically between 0.76 mm and 3.2 mm and more preferably between 1.5 mm and 3.2 mm.

While FIG. 11 illustrates an alternative embodiment including an animal bedding material 410 contained within a frangible cover 412, as previously described, a fluid absorbent pad assembly 320 including only a fluid absorbent pad 354, a fluid permeable fluid permeable upper surface 374, e.g., platform 356 and lacking a bedding material is also considered within the scope of this invention.

5. Invertible Housing Embodiment

Figure 12:
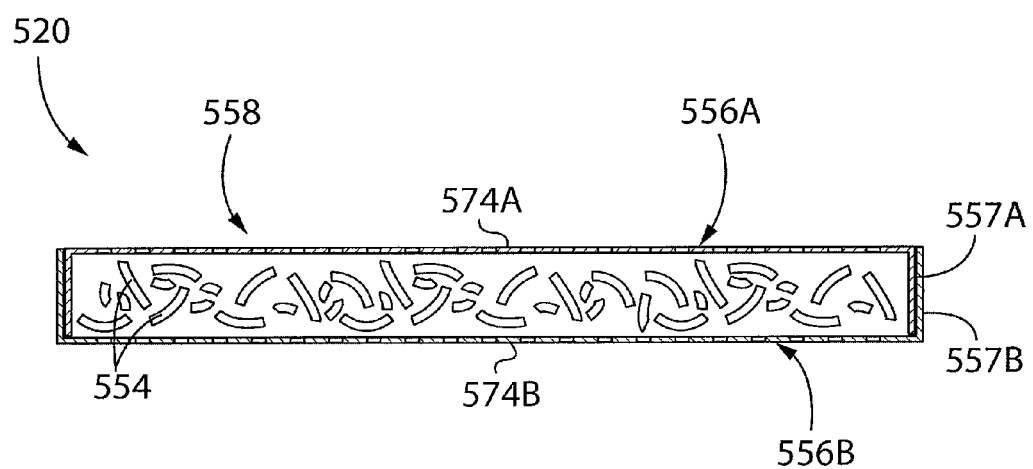
FIG. 12 is a side elevation view of a fluid absorbent assembly constructed in accordance with yet another embodiment of the invention.

Referring now to FIG. 12, an absorbent assembly 520 constructed with yet another embodiment of the present invention is illustrated in which the opposed sides of the housing are at least generally symmetrical in size and construction so that the housing may be placed in a cage or cage liner with either of its two opposed vertical surfaces facing upwardly and being serviceable as an animal support structure. The resulting absorbent assembly thus is invertible, considerably facilitating its use because the technician need not be concerned with installing the assembly upside down.

The absorbent assembly 520 of this embodiment includes a two-part housing 558 and absorbent material 554. The material 554 of this embodiment is not contained within a pad but, instead, is contained solely by the housing 558. As with previous embodiments, the fluid absorbent material 554 may comprise or be impregnated with or otherwise combined with a material that absorbs or neutralizes noxious vapors. The material 554 also could be retained within a pad, if desired.

The housing 558 includes first and second sections 556A and 556B coupled to one another so as define a hollow space therebetween for storing the absorbent material 554. Each housing section 556A, 556B has a perforated relatively rigid upper surface 574A, 574B serviceable as a water permeable platform for supporting animal(s). The platforms 574A, 574B may be of generally identical size and shape are so as to provide an animal support surface that remains generally the same regardless of which of the two sections 556A, 5556B faces upwardly.

The housing sections 556A, 556B are coupled to one another so that they move vertically away from one another upon expansion of the absorbent material retained therebetween. In this embodiment, section 556 A has a peripheral wall 557A that is telescopically received in peripheral wall 557B of section 556B. The sections 556A, 556B could alternatively be connected by a bellows or by a frangible structure that breaks under the pressure of the expanding absorbent material 554.

6. Embodiment Lacking Animal Support Structure

An animal support structure is not essential to successful implementation of an absorbent material in an animal cage. Indeed, at least some types of fluid absorbent material can be mixed with or positioned beneath a layer of an animal bedding material or even, conceivably, serve as an animal bedding material.

Figure 13:
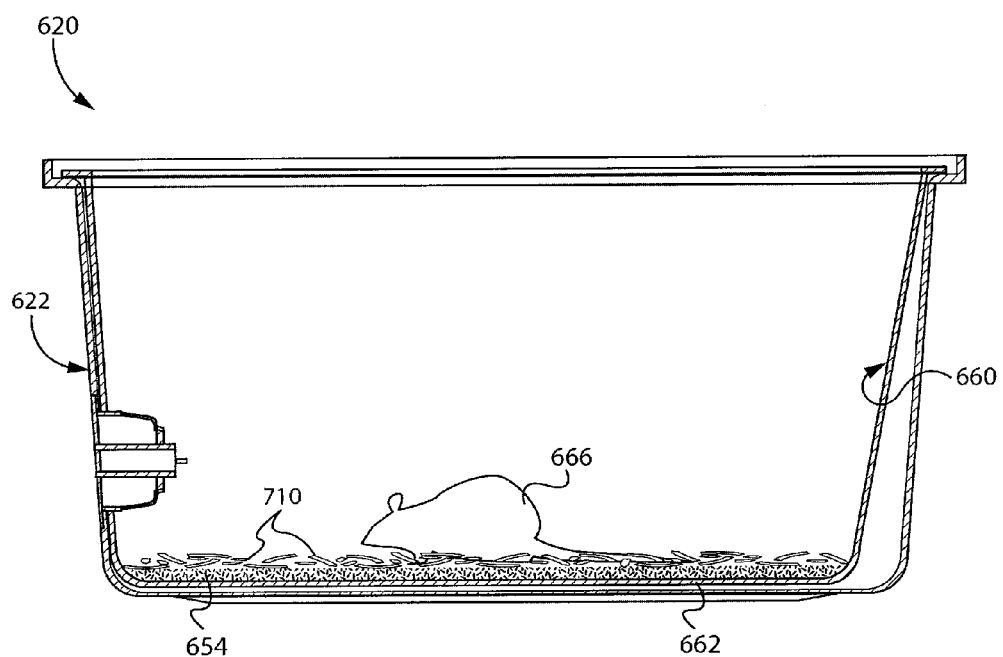
FIG. 13 is a sectional side elevation view of a cage incorporating a fluid absorbent assembly constructed in accordance with yet another embodiment of the invention, showing the cage without a drinking valve leak.

An embodiment constructed in accordance with this concept is schematically illustrated in FIG. 13. The fluid absorbent material 654 of this embodiment, which may take a granular form, is deposited directly on the floor 662 of a cage liner 660 positioned within a cage 622. With one exception, the cage 622 and cage liner 660 are identical to those of the first embodiment and need not be described in greater detail. That exception resides in the omission of the above-described tabs or lugs on the liner walls, which serve no purpose in the absence of an animal support surface.

The fluid absorbent material 654 may be simply positioned directly in the cage in loose form or may be provided in a frangible pouch or cover (not shown) that can be torn apart by an animal's teeth or claws. It also could be mixed with a bedding material or even serve as the bedding material, depending on the type of fluid absorbent material that is chosen for a particular application. Alternatively, a layer of the bedding material 710 could be simply placed on top of the fluid absorbent material 654, as is illustrated in FIG. 13. In addition, and as in the previous embodiments, the fluid absorbent material may be mixed with, impregnated with, or formed from a material that vaporizes or neutralizes noxious vapors.

Of course, the fluid absorbent material 654 and any accompanying materials could be placed directly into a cage in an application lacking a cage liner.

7. In Use

Having previously described the structure of the fluid absorbent pad assembly 120, in accordance with embodiments of the invention, the fluid absorbent pad assembly 120 will now be described in use in reference to FIGS. 7 and 8.

Assembly of fluid absorbent pad assembly 120 includes placing the fluid absorbent pad 154 into the receptacle 194 formed when the platform or first housing element 156 and the floor frame or second housing element 172. The bedding material 210 may be retained within a cover 212 affixed to the platform 156 by the manufacturer or may come in a pouch (not shown) simply placed on top of the platform 156 by the technician. The assembled housing 158 is placed into the bottom of the cage liner 160 such that the second housing element 172 rests on the upper surface of cage liner floor 162. As the housing 158 is placed into position, the platform or first housing element 156 snaps past the protruding tabs 208 located on the inner surface of the front and rear walls 198, 200 of the cage liner 160 and is subsequently retained by the tabs 208. The cage liner 160 then is placed with the interior 148 of an animal cage 122 by pivoting the cage liner 160 about the animal cage grommet 152 and drinking valve 132, until the cage liner 160 rests on the upper surface of the animal cage floor 138. One or more animals 166 are then placed into the cage 122.

If no drinking valve 132 or bottle leak event occurs, the cage liner 160 may subsequently be removed from the animal cage 122 and cleaned, and the fluid absorbent pad assembly 120 may be replaced by a new fluid absorbent pad assembly 120. Due to the presence of a noxious vapor absorbent material in the fluid absorbent pad 154 and the ability of the pad to absorb urine and minor water spills, the "change" period between cage cleanings can be considerably extended even in the absence of a water leak. The fluid absorbent pad assembly 120 may preferably be changed once after between 2 days and 21 days without a drinking valve 132 leak, the fluid absorbent pad assembly 120 may more preferably be changed once after 21 days without a drinking valve 132 leak.

Alternatively, if a drinking valve 132 begins to leak, the water will drip through the animal bedding material 210, and through the apertures 182 in the platform 156 prior to being absorbed by the fluid absorbent materials located in the fluid absorbent pad 154. Absorption of water into the fluid absorbent pad 154 causes the expanding fluid absorbent pad 154 to simultaneously exert a force against both the upper surface of the cage liner floor 162 and the housing 158. Resultantly, the force exerted by the expansion of the fluid absorbent pad 154 on the housing 158 is sufficient to disengage the housing 158 from the cage liner tabs 208 and elevates the housing 158 to a position in which the upper surface 174 of the platform 156 is above the water level, thereby keeping the animal 166 dry.

If the cage dimensions otherwise can accommodate such expansion and the cage contains a grommet, the fluid absorbent pad 154 may expand to a fully saturated height, such that first upper surface 174 of the platform 156 is raised above the height of at least a portion of the animal cage grommet 152. Any additional water that leaks into the animal cage 122 will flow out of the opening 150 in the rear wall 142 of the cage 122.

A color change in transformative visual indicia 168 located on the fluid absorbent pad 154 will signal the drinking valve 132 leak to either a technician or electrical or thermal sensor prior to saturation of the fluid absorbent pad 154. As indicated above, other sensor arrangements could be used as well.

In an embodiment lacking an animal support structure, the animal(s) 666 (FIG. 13) would simply be supported on the fluid absorbent material, either directly or indirectly via an intervening layer of bedding material, and would simply rise with the rising level of fluid absorbent material and any bedding supported thereon.

Many changes and modifications could be made to the invention without departing from the spirit thereof. The scope of these changes and modifications will become apparent from the appended claims.

We claim:

1. A fluid absorbent assembly for use in an animal cage, the fluid absorbent assembly comprising:
a fluid absorbent material insertable into the animal cage, an animal support structure disposed above the fluid absorbent material and configured to support at least one animal thereon,
wherein the fluid absorbent material expands upon absorbing fluid to lift an upper surface of the animal support structure from a first height to a second height greater than the first height.

2. The fluid absorbent assembly of claim 1, wherein the animal support structure has a length and width substantially equal to a length and width of an interior of the animal cage.

3. The fluid absorbent assembly of claim 2, wherein the fluid absorbent material is encased in a fluid permeable pad.

4. The fluid absorbent assembly of claim 1, wherein the animal support structure includes a relatively rigid platform having a fluid permeable upper surface.

5. The fluid absorbent assembly of claim 4, wherein the platform has apertures fanned therethrough for the passage of fluids.

6. The fluid absorbent assembly of claim 4, wherein the platform is formed by a first housing element, and further comprising a second housing element disposed beneath the first housing element, and wherein the first housing element is configured to mate with the second housing element and to form a receptacle between the first and second housing elements for receiving the fluid absorbent material.

7. The fluid absorbent assembly of claim 6, wherein the second housing element comprises a frame having an opening through which a pad containing the fluid absorbent material extrudes upon expansion of the fluid absorbent material.

8. The fluid absorbent assembly of claim 6, wherein the second housing element comprises a rigid fluid permeable structure that is serviceable as a platform for supporting an animal thereon.

9. The fluid absorbent assembly of claim 4, further comprising a cage liner configured to be removeably received within the animal cage, wherein the platform is dimensioned to be received in the cage liner.

10. The fluid absorbent assembly of claim 4, further comprising an animal bedding material disposed above the platform, wherein the bedding material is enclosed within a frangible cover attached to the platform.

11. The fluid absorbent assembly of claim 1, wherein the fluid absorbent material or a material combined with the fluid absorbent material is capable of absorbing or neutralizing noxious vapors.

12. The fluid absorbent assembly of claim 1, wherein the fluid absorbent material is contained in a pad having a transformative visual indicia having a first appearance when the pad is dry and a second appearance when the fluid absorbent material has absorbed a volume of fluid.

13. The fluid absorbent assembly of claim 1, herein the second height is at least approximately one and a half times greater than the first height.

14. A fluid absorbent pad assembly for use in an animal cage, the fluid absorbent pad assembly comprising:
a housing dimensioned to be received in an animal cage, the housing forming a relatively rigid fluid permeable platform capable of supporting at least cine animal thereon, and
a fluid absorbent pad received beneath the platform, the pad having a fluid absorbent material,
the fluid absorbent material expanding upon absorbing fluid to lift the platform from a first height to a second height greater than the first height.

15. The fluid absorbent pad assembly of claim 14, wherein the platform has a substantially planer upper surface, and has a plurality of fluid permeable apertures extending therethrough.

16. The fluid absorbent pad assembly of claim 15, wherein the platform is a first housing element, wherein the housing further comprises a second housing element disposed beneath the first housing element, and wherein the first housing element is configured to mate with the second housing element and to form a receptacle therebetween for receiving the pad.

17. The fluid absorbent pad assembly of claim 16, wherein the second housing element comprises a frame having an opening through which a pad containing the fluid absorbent material extrudes upon expansion of the fluid absorbent material.

18. The fluid absorbent assembly of claim 16, wherein the second housing element comprises a rigid fluid permeable structure that serviceable as a platform for supporting an animal thereon.

19. The fluid absorbent pad assembly of claim 16, wherein the first housing element has a length and width substantially equal to a length and width of an interior of the animal cage.

20. The fluid absorbent pad assembly of claim 14, further comprising a cage liner configured to be received within the animal cage, wherein the housing is dimensioned to be received in the cage liner.

21. The fluid absorbent pad assembly of claim 20, wherein the housing is configured to be retained against at least one interior wall of the cage liner when the platform is at the first height and to release from the at least one interior wall of the cage liner when the platform rises above the first height.

22. The fluid absorbent pad assembly of claim 14, further comprising an animal bedding material disposed above the first housing element, wherein the bedding material is enclosed within a frangible cover attached to the housing.

23. The fluid absorbent pad assembly of claim 14, wherein the fluid absorbent material or a material included with the fluid absorbent material is capable of absorbing or neutralizing noxious vapors.

24. An animal cage assembly comprising:
an animal cage having an interior configured to house at least one animal; and
a fluid absorbent material disposed in the cage beneath any animals housed in the cage, wherein the fluid absorbent material expands upon absorbing fluid from a first height to a second height greater than the first height, wherein the fluid absorbent material is loose in the cage and supports any animals in the cage either directly or indirectly via an intervening layer of a bedding material.

25. An animal cage assembly comprising:
an animal cage having an interior configured to house at least one animal; and
a fluid absorbent material disposed in the cage beneath any animals housed in the cage, wherein the fluid absorbent material expands upon absorbing fluid from a first height to a second height greater than the first height, and further comprising a relatively rigid fluid permeable animal support structure positioned in the cage above the fluid absorbent material.

26. A method of absorbing fluid in an animal cage, the method comprising the steps of:
inserting, into the animal cage, a fluid absorbent assembly; wherein the fluid absorbent assembly further comprises a fluid permeable animal support structure that is positioned above a fluid absorbent material and that supports an animal;

absorbing a volume of fluid in the animal ca to the fluid absorbent material; and in response to the absorbing step, expanding the fluid absorbent material to lift the animal housed in the cage from a first height to a second height greater than the first height.

27. A method of absorbing fluid in an animal cage, the method comprising the steps of:

inserting, into the animal cage, a fluid absorbent material;

absorbing a volume of fluid in the animal cage into the fluid absorbent material;

in response to the absorbing step, expanding the fluid absorbent material to lift an animal housed in the cage from a first height to a second height greater than the first height; and detecting absorbent material expansion using one an optical detector, a thermal detector, and an electrical sensor.

* * * * *

UNITED STATES PATENT AND TRADEMARK OFFICE
CERTIFICATE OF CORRECTION

PATENT NO. : 8,826,861 B2  Page 1 of 1
APPLICATION NO. : 13/740824
DATED : September 9, 2014
INVENTOR(S) : Kuzniar et al.

It is certified that error appears in the above-identified patent and that said Letters Patent is hereby corrected as shown below:

IN THE CLAIMS

CLAIM 5, Line 2          Replace "fanned" with "formed"
Col. 13, Line 17

CLAIM 14, Line 5         Replace "cine" with "one"
Col. 13, Line 58

Signed and Sealed this
Ninth Day of December, 2014

Michelle K. Lee
*Deputy Director of the United States Patent and Trademark Office*